United States Patent [19]

Yoshida et al.

[11] Patent Number: 4,961,495
[45] Date of Patent: Oct. 9, 1990

[54] PLASTIC CONTAINER HAVING AN EASY-TO-PEEL SEAL FORMING COMPARTMENTS

[75] Inventors: Takao Yoshida, Tama; Tatsuo Suzuki, Machida, both of Japan

[73] Assignee: Material Engineering Technology Laboratory, Incorporated, Tokyo, Japan

[21] Appl. No.: 363,775

[22] Filed: Jun. 9, 1989

[30] Foreign Application Priority Data

Jun. 10, 1988 [JP] Japan .................... 63-143399

[51] Int. Cl.⁵ .................................... B65D 30/02
[52] U.S. Cl. ...................... 206/219; 206/632; 206/806; 206/828; 206/524.9; 383/94; 383/38; 428/35.2
[58] Field of Search .......... 206/219, 632; 383/94; 428/35.2

[56] References Cited

U.S. PATENT DOCUMENTS

| | | | |
|---|---|---|---|
| 3,608,709 | 9/1971 | Pike | 206/219 |
| 4,252,846 | 2/1981 | Romesberg et al. | 428/35.2 |
| 4,528,220 | 7/1985 | Hwo | 428/35 |
| 4,565,720 | 1/1986 | Yaeo et al. | 383/94 X |
| 4,613,547 | 9/1986 | Wagner | 428/349 |
| 4,629,080 | 12/1986 | Carveth | 206/219 X |
| 4,663,218 | 5/1987 | Akao | 428/212 |
| 4,705,174 | 11/1987 | Goglio | 383/94 X |
| 4,770,295 | 9/1988 | Carveth et al. | 206/632 X |
| 4,772,497 | 9/1988 | Maasola | 428/35.2 |
| 4,775,562 | 10/1988 | Shishido et al. | 428/35.2 |
| 4,778,697 | 10/1988 | Genske et al. | 428/35.2 |
| 4,784,885 | 11/1988 | Carespodi | 206/632 X |
| 4,828,892 | 5/1989 | Kersten et al. | 428/35.2 |

FOREIGN PATENT DOCUMENTS

| | | | |
|---|---|---|---|
| 311246 | 11/1973 | Australia . | |
| 0011500 | 5/1980 | European Pat. Off. . | |
| 0040931 | 12/1981 | European Pat. Off. . | |
| 0095299 | 11/1983 | European Pat. Off. . | |
| 132632 | 2/1985 | European Pat. Off. | 206/219 |
| 0144999 | 6/1985 | European Pat. Off. . | |
| 3426465 | 1/1986 | Fed. Rep. of Germany | 206/219 |
| 2069786 | 9/1971 | France . | |
| 2423413 | 11/1979 | France . | |
| 2537981 | 6/1984 | France . | |
| 943498 | 12/1963 | United Kingdom . | |
| 2003449 | 3/1979 | United Kingdom | 206/632 |
| 8202700 | 8/1982 | World Int. Prop. O. . | |

Primary Examiner—William I. Price
Attorney, Agent, or Firm—Oblon, Spivak, McClelland, Maier & Neustadt

[57] ABSTRACT

Disclosed herein is a container in which a mixture of resins having different melting starting temperatures is used as a heat-sealable layer. The heat-sealable layer is heat-sealed at two or more locations under different conditions so that at least one hermetic heat seal and at least one heat seal having easy-to-peel openability are formed to define plural compartments isolated from one another. The compartments can be filled with different materials. These materials are isolated from one another until immediately before use. Upon application, the heat seal having easy-to-peel openability is broken from the outside to permit mixing of the materials. The container is useful for foods, medical and pharmaceutical substances, and the like.

6 Claims, 2 Drawing Sheets

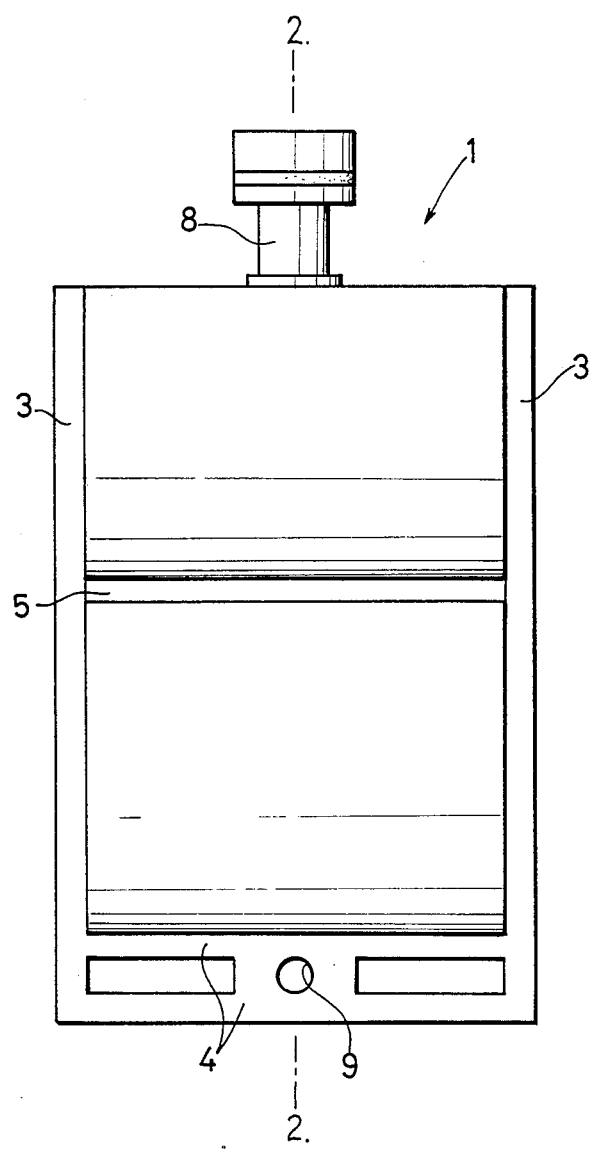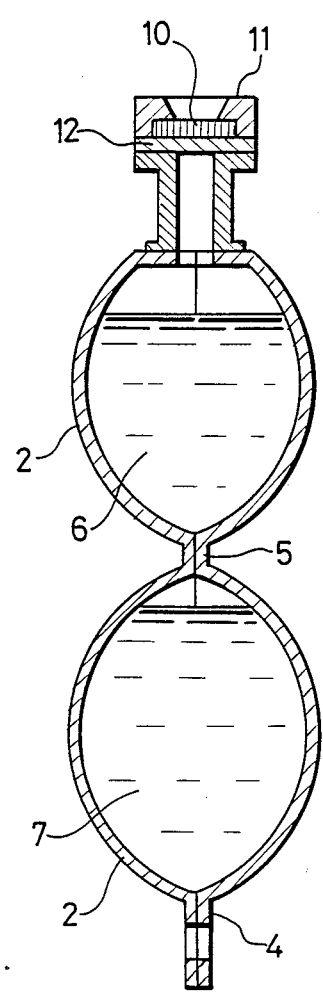

PLASTIC CONTAINER HAVING AN EASY-TO-PEEL SEAL FORMING COMPARTMENTS

BACKGROUND OF THE INVENTION (a) Field of the Invention:

This invention relates to a container and also to a filled container. Described more specifically, this invention is concerned with a container for holding plural contents as individually separate items, especially to a container for permitting mixing of plural contents, which have been hermetically sealed in mutually-isolated plural compartments, immediately before use without opening the container, namely, without exposing the contents to the surrounding atmosphere. This invention also pertains to a similar container filled with contents.

(b) Description of the Related Art:

There has conventionally been a strong demand for containers adapted to mix two or more substances, e.g., medicinal and pharmaceutical substances of different kinds in a hermetically-sealed state immediately before use. This demand is particularly strong, for example, for warming or cooling media using reaction heat to be produced upon mixing two or more kinds of substances, foods and medicinal and pharmaceutical substances containing two or more substances which must be mixed immediately before use because of their modifications or deterioration along the passage of time when stored or processed as a mixture, and like products.

Namely, there are many medicinal and pharmaceutical substances which are susceptible to deterioration when stored or processed as a mixture, for example, to thermal deterioration when subjected to sterilization in an autoclave, or to modifications upon standing. In addition, mixing of two or more medicinal and pharmaceutical substances in a hospital involves a potential danger that they may be contaminated upon mixing. Prevention of such contamination requires a complex operation. This may lead to an operational error. There has hence been a demand for containers which permit mixing of two or more medicinal and pharmaceutical substances by a simple operation and moreover in a completely closed system immediately before use.

For example, high-calorie transfusion solutions are used for intravenous hyperalimentation (IVH) therapy which is applied widely in recent years. It is essential for such transfusion solutions to contain suitable amounts of all nutrients required for the human body. Namely, they are multi-component transfusion solutions containing sugars, amino acids, principal electrolytes, trace metals, vitamins, etc. Under the circumstances, it is however impossible to prepare each transfusion solution as a single composite solution containing all the ingredients in view of their mutual compatibility, their stability in the course of the preparation of the transfusion solution and the stability of the transfusion solution upon standing. For example, when glucose and amino acids are mixed and sealed as a single-pack liquid preparation in a container, reactions take place between the glucose and amino acids upon autoclave sterilization or during storage so that the thus-prepared transfusion solution may be colored or modified. Under the circumstances, several drug solutions marketed separately are mixed upon or before administration. This however requires a complex operation and thus involves a potential danger of dispensing error. Further, this does not enable mixing of the drug solutions in a completely closed system and is therefore not satisfactory from the standpoint of safety against hospital infection. For these reasons, there is an outstanding desire for the development of containers which permit mixing of two or more medicinal and pharmaceutical substances by a simple operation and in a completely closed system.

Recently, some drug preparations are available in containers with a means of isolation provided internally. The isolation means is broken or otherwise opened immediately before use, so that the ingredients of each drug preparation can be mixed within its container. Conventional isolation means include a plug fixed in each partition dividing a container into plural compartments so that the plug is broken from the outside of the container to communicate the compartments to each other upon use. As an alternative, each partition dividing a container into plural compartments is formed partly open and the open portion of the partition is externally closed by a clip. The former isolation means, namely, the plug system however requires the insertion of a separately-formed plug into a container and then its bonding to the container. This operation however has a high risk of contamination of the interior of the container. Furthermore, it is difficult to hermetically bond the plug and container. For the bonding of the plug and container, high-frequency welding is suitable because it can easily establish bonding of a three-dimensional structure. However, materials which can be bonded by high-frequency welding are limited to those having a large dielectric loss such as polyvinyl chloride resin and ethylene-vinyl acetate copolymer. Polyolefin resins which assure a high degree of safety have a small dielectric loss, so that they cannot be used. On the other hand, the latter isolation means, namely, the clip system does not allow one to find out whether the partition has been opened or not in the course of transportation or storage. This leads to significant uneasiness and concern by the user. To ensure the isolation, it is also necessary to form the open portion as small as possible. This however leads to another requirement that when plural medicinal and pharmaceutical substances are mixed, they must be put together in a large mixing compartment. As a result, there is a further problem that the overall size of the container becomes greater.

SUMMARY OF THE INVENTION

It is a first object of this invention to provide a container having at least one isolation means dividing the interior of the container into compartments to hold plural contents, which respectively contain components reactive to each other, in an isolated state until immediately before use, thereby making it possible to store them without modifications for a long period of time. Upon application, the isolation means is opened to communicate the compartments to each other, so that the contents can be easily mixed together.

It is a second object of this invention to provide a container equipped with at least one isolation means which has good sealing property Failure of the isolation means can be easily discovered if it should take place. Further, the isolation means permits formation of a large communication opening.

It is a third object of this invention to provide a filled container which can be fabricated while maintaining the cleanliness of the interior at a high level, assures good productivity and is economical.

In one aspect of this invention, there is thus provided a thermoplastic container having at least two heat-sealed portions of different seal strengths. The heat-sealed portions are formed of the same resin which is a resin mixture of at least two polyolefin resins.

In a second aspect of this invention, there is also provided a filled container including a container made of a polyolefin resin and defining a plurality of compartments isolated from one another by at least one seal as an isolation means, said seal having easy-to-peel openability, and contents filled separately in the respective compartments, whereby upon use of the filled container the contents can be mixed together without exposure to the surrounding atmosphere by externally breaking the isolation means and communicating the compartments to one another. A resin taking a part in direct bonding of at least one portion of a peripheral seal hermetically sealing a sheet or sheets of a main body of the container is the same as a resin taking a part in direct bonding of the isolation means and the resin taking parts in the direct bondings is a resin mixture composed of at least two polyolefin resins.

BRIEF DESCRIPTION OF THE DRAWINGS

FIG. 1 is a simplified plan view of a filled container according to one embodiment of this invention;

FIG. 2 is a cross-sectional view taken along the line X—X' of FIG. 1;

DETAILED DESCRIPTION OF THE INVENTION

Figure 3:
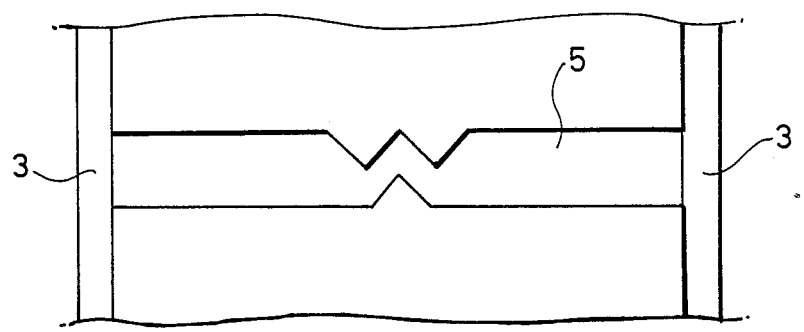
FIG. 3 is a fragmentary plan view of a surface of a patterned seal portion having easy-to-peel openability.

The technical concept of this invention basically resides in that at least two heat-sealable portions formed of a mixture of two or more resins having different melting starting temperatures are heat-sealed under different conditions respectively to form one of the heat-sealed portions as a heat-sealed portion having easy-to-peel openability and the other heat-sealed portion as a strong seal.

Containers and filled containers of this invention, which are fabricated in the above manner, can be used widely as containers for foods and also as medical, industrial and domestic containers.

For better understanding of this invention, the present invention will hereinafter be described specifically with reference to the drawings illustrating by way of example medical bags for drug solutions, which the present inventors are most interested with.

Use of containers of this invention as medical bags for drug solutions makes it possible not only to prevent modifications of the contents by autoclave sterilization and due to changes upon standing but also to expect their advantageous effects in preventing bacteria contamination upon mixing drug solutions in hospitals. Further, containers with improved interior cleanliness can also be expected by making suitable selection in connection with their structure and fabrication method. Medical bags for drug solutions can therefore be considered as containers which are expected to exhibit the advantages of the present invention to a maximum extent.

FIG. 1 is a simplified plan view of a container according to one embodiment of this invention, which are filled with two kinds of drug solutions containing components susceptible to modifications if they are mixed and subjected to autoclave sterilization. FIG. 2 is a cross-sectional view taken along the line X—X' of FIG. 1.

The container, generally indicated at numeral 1, is formed of a pair of polyolefin sheets 2 and is hermetically sealed along its periphery to have bag-like configurations. Namely, side seal portions 3,3 and a bottom seal portion 4 are hermetically closed by seals having sufficient strength. Further, a seal having easy-to-peel openability is formed as an isolation means 5 transversely around a longitudinally central part of the container, whereby the interior of the container is divided into two compartments 6,7. One of two kinds of drug solutions, which respectively contain components susceptible to modifications if they are mixed and subjected to autoclave sterilization, is filled and sealed in one of the two compartments 6,7 of the container 1, namely, in the compartment 6, while the other drug solution is filled and sealed in the other compartment 2. The container 1 with the drug solutions filled therein has been subjected to autoclave sterilization.

Upon using the drug solutions, the isolation means 5, namely, the seal having easy-to-peel openability is peeled off by an operation from the outside of the container 1 to communicate the two compartments 6,7 to each other, whereby the two kinds of drug solutions can be mixed without exposure to the surrounding atmosphere.

As means to be employed upon administration of the thus-mixed liquid drug preparation to the human body, the container 1 has at one end thereof a discharge port 8, namely, a port for discharging the liquid drug preparation from the container 1 and at the other end thereof a hang-up hole 9, namely, a hole for hanging up the container on an irrigator stand. In general, the opening of the discharge port 8 is sealed by a cap assembly which is composed of a rubber plug 10, a cap 11 and a diaphragm 12 for preventing direct contact between the rubber plug 10 and the associated drug solution.

The hermetic seal portions 3,3,4 formed at the peripheral edges of the sheets 2,2 and the isolation means 5 are all formed by superposing the sheets 2,2, which form a main body of the container 1, and heat-sealing the confronting surfaces of the sheets 2,2 at the corresponding positions. The resin which makes up the confronting surfaces thus heat-sealed, in other words, the resin taking a part in their direct bonding is the same resin no matter whether the seal portion is a hermetic seal or a seal having easy-to-peel openability. By choosing different sealing conditions, the hermetic seals and the seal having easy-to-peel openability are formed respectively.

Resins, which permit the formation of both hermetic seals and a seal having easy-to-peel openability by choosing different sealing conditions as described above, are each obtained by mixing at a suitable ratio two or more resins having suitable degrees of compatibility. If the compatibility of mixed resins is too good, sealing conditions capable of providing easy-to-peel openability are limited to an extremely narrow range so that easy-to-peel openability cannot be obtained stably. If their compatibility is excessively poor on the other hand, the hermetic seal portions cannot have sufficient sealing strength. It is therefore necessary that the resins in the resin mixture are dissolved mutually to a suitable extent.

The easy-to-peel openability of the resin mixture useful in the practice of this invention is obtained by melting and mixing resins of different miscibilities and forming the resultant mixture into sheets whose surfaces are divided into minute areas having different heat-sealability, in other words, by changing the heat-sealability from one minute area to another on the surface of each of the sheets. Namely, the easy-to-peel openability is obtained by providing minute spots having different sealing strengths on the sealable surfaces. On the other hand, the hermetically sealing property of the resin mixture useful in the practice of this invention is obtained by ensuring mutual dissolution of the resins forming the surfaces of the sheets so that the bonding strength can be enhanced close to the strength of the resin mixture itself.

It is preferred for the seal having easy-to-peel openability to choose as a sealing temperature a temperature lower than the melting starting temperature or heat-sealing temperature of the resin, the melting starting temperature or heat-sealing temperature being higher than the corresponding temperature of the other resin. On the other hand, it is preferred for the hermetic seals to choose as a sealing temperature a temperature at least higher than the melting starting temperature or heat-sealing temperature of the resin, the melting starting temperature or heat-sealing temperature being higher than the corresponding temperature of the other resin.

Where the mutual compatibility of resins mixed together is excessively good, the surfaces of resulting sheets are not be divided into minute areas having different heat sealabilities, thereby failing to provide a seal having easy-to-peel openability. Where the mutual compatibility of the resins mixed together is excessively poor, minute areas in each sheet surface are united together only by weak forces. Even if optimum sealing conditions are chosen, the resin mixture itself becomes brittle and separates into pieces. As a result, the seals are easily peeled off so that satisfactory hermetic seals cannot be obtained.

The resin mixture usable in this invention can be obtained by melting and mixing olefin resins having different degrees of compatibility, such as low-density polyethylene resin, high-density polyethylene resin resin, polypropylene resin, polybutene resin and polybutadiene resin. Upon their melting and mixing, a copolymer having compatibility with both resins can be added as a third component to enhance the mutual compatibility of the resins. In addition, in order to shift the compatibility of one or both of the resins to the compatibility of the other resin or resins, they may be formed into copolymers to enhance the mutual compatibility of the resins and to improve the strength of the resin mixture. The suitable mixing ratio of the resins varies depending on the mutual compatibility of the resins to be mixed, such as the kinds of the resins to be used and the degree of copolymerization, and the sealing temperature. The only requirement is that the proportion of the resin having a higher melting starting temperature ranges from 10% to 90%. To obtain a seal having stable easy-to-peel openability, the resin having the higher melting starting temperature begins to melt at a temperature from 8° C. to 100° C., preferably from 20°–60° C. higher than the resin having the lower melting starting temperature. More preferably, the resin having the higher melting starting temperature is a polypropylene resin or a copolymer thereof and its proportion ranges from 20% to 80%.

The term "melting starting temperature" as used herein means the lowest temperature at which the same resins can be welded together. Where a resin has a melting point, this term indicates the melting point.

On the other hand, the term "sheet" as used herein means either a sheet or a film. No particular limitation is imposed on its thickness as long as it has sufficient strength for the intended application.

The sheets of the main body of the container may each be a single-layer sheet of the resin mixture or a multi-layer sheet provided with another resin layer as an outer layer. In the case of a multi-layer sheet, the resin forming the layer adjacent to the resin mixture may preferably be substantially the same as one of the resins of the resin mixture or be a mixture containing one of the resins, because less ply separation tends to occur especially upon opening of the easy-to-peel seal. Where the container has flexibility, is used to contain medicinal and pharmaceutical substances and is subjected to sterilization after being filled with the substances, the resin forming the thickest layer of the multi-layer sheet may preferably be a resin composed principally of linear polyethylene in view of heat resistance, safety to the human body, etc. Incidentally, the term "substantially the same resin" as used herein means a resin whose compatibility or bondability with one of the resins of the resin mixture is comparable with the mutual compatibility or bondability between the latter resin per se.

According to the present invention, the hermetic seals and the seal having easy-to-peel openability can be both obtained by simply processing the sheets from the outside. Therefore, use of a film formed into a tubular shape by a co-extrusion and inflation technique as a sheet material for a main body of a filled container of this invention makes it possible to proceed with its fabrication without any contamination of its interior until it is filled with contents.

Any sealing or thermal welding technique can be used for heat seals in this invention as long as it can heat each resin to its melting starting temperature to firmly put the sealable surfaces together. Exemplary techniques include heat sealing, impulse sealing, ultrasonic welding, and high-frequency induction heating. Furthermore, techniques for applying peripheral hermetic heat seals in particular include parison pinching which is conducted by means of pinching dies in blow molding. Heat sealing is however most preferred because the temperature control is easy upon formation of the seal having easy-to-peel openability and the formation of a seal having stable easy-to-peel openability is easier.

Figure 4:
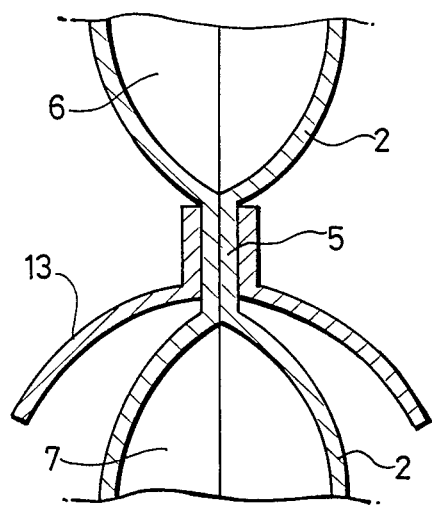
FIG. 4 is a fragmentary cross-sectional view of a seal portion having easy-to-peel openability and provided with pull-tabs for peeling off the seal portion.

To make the seal having easy-to-peel openability resistant to peeling until its peeling operation but to facilitate its peeling by the peeling operation, the seal having easy-to-peel openability can be patterned as shown in FIG. 3 or peel-tabs 13 may be provided to facilitate pulling as depicted in FIG. 4.

Use of the above-described filled container of this invention as a medical container can achieve the objects of this invention and at the same time, can bring about the following merits. Namely, the container can be made of polyolefin resins only, so that the filled container has a high degree of safety. Further, flexible resins can be chosen for the container, thereby making it possible to establish an ideal transfusion system of the closed system.

As has already been understood from the foregoing description of the filled container, the container of this invention has at least two heat-sealed portions of different seal strengths and both heat-sealed portions are formed from the same resin mixture of at least two polyolefin resins.

One of the heat-sealed portions is a peripheral heat seal and another is a heat seal having easy-to-peel openability. These heat seals are formed stepwise depending on the kinds of substances to be filled, the application purpose, the filling procedure, etc.

For example, the periphery except for a peripheral edge portion of one side, namely, three sides may be hermetically sealed. One of two substances is filled in the resultant bag. A seal of easy-to-peel openability is then applied. The other substance is then filled, followed by hermetic sealing of the remaining one side. Other methods and procedures may also be used as will be described subsequently in examples.

The container according to this invention may be a container sealed at desired locations in accordance with these methods and procedures.

This invention will hereinafter be described more specifically by the following examples.

EXAMPLE 1

Linear low-density polyethylene ("MORETEC", trade mark; product of Idemitsu Petrochemical Co., Ltd.; density: 0.916 g/cm$^3$; MI: 2; melting point: 122° C.) and polypropylene ("CHISSO POLYPRO", trade name; product of Chisso Corporation; density: 0.90 g/cm$^3$; MI: 0.7; melting point: 160° C.) were kneaded at the ratios shown in Table 1 by means of a twin roll (roll temperature: 175° C.). Each of the resultant polyblends were pressed under heat (press temperature: 185° C.), whereby sheets of about 0.2 mm thick, 200 mm long and 100 mm wide were produced.

TABLE 1

| Sample number | Mixing Ratios of Resins | | | | | |
|---|---|---|---|---|---|---|
| | 1 | 2 | 3 | 4 | 5 | 6 |
| Resin | | | | | | |
| PP | 1 | 2 | 4 | 6 | 8 | 9 |
| LLDPE | 9 | 8 | 6 | 4 | 2 | 1 |

PP: Polypropylene resin
LLDPE: Linear low-density polyethylene resin

Next, two of the sheets were superposed and sealed along the peripheries thereof by an impulse sealer ("AUTOSEALER FA-300-5W", trade name; manufactured by Fuji Impulse Co., Ltd.), whereby hermetic seals were formed along the peripheries to give a container-like shape. The following sealing conditions were employed: sealing time—1.5 seconds, cooling time—5 seconds. A central part of the container was next sealed by a heat sealer manufactured by the assignee company and having upper and lower heating dies to form a seal of 10 mm wide and 100 mm long, thereby obtaining an isolation means having easy-to-peel openability. As the sealing conditions, the central part was pressed for 12 seconds at a temperature which was selected from a range of from 130° C. to 150° C. and was most suitable for the composition of the corresponding resin mixture. The stopper and pressing pressure were adjusted to avoid pressing-down of the sealable surfaces by the pressing operation.

Then, one corner of each compartment of the container was cut off and opened. After filling each compartment with 100 ml of water, the opened corner portion was sealed by the impulse sealer. The container was then sterilized in an autoclave, thereby providing a filled container. The following sealing conditions were employed: sealing time—1.5 seconds, cooling time—5 seconds. After cooling, the seal having easy-to-peel openability of the filled container was not peeled off at all. Further, the container was sandwiched between two iron plates which were arranged in parallel to the sealable surfaces. The container was then pressed until the internal pressure of the container reached 0.1 kg/cm$^2$. Breakage such as peeling-off was not observed at all on the whole sealable surfaces, including the seal having easy-to-peel openability. One of the compartments of the filled container was next twisted and squeezed down by both hands. It was found that the isolation means, i.e., the seal having easy-to-peel openability was easily peeled off. The thus-communicated container, namely, the container in which the seal having easy-to-peel openability had been peeled off was sandwiched between two iron plates disposed in parallel to the sealable surfaces of the container. To investigate the peelability of the peripheral seals, the container was then pressed until its internal pressure reached 0.7 kg/cm$^2$.

As a result, no seal breakage was observed at the peripheral seals of each sample container. No substantial peeling was observed. It was hence found that good hermetic seals were obtained.

Regarding the seal having easy-to-peel openability, good easy-to-peel openability, namely, peeling of isolation means was obtained from Sample No. 2 to Sample No. 5 by choosing suitable sealing conditions. However, easy-to-peel openability was obtained only partly from Sample No. 1 and Sample No. 6.

EXAMPLE 2

Low-density polyethylene ("PETROSEN", trade mark; product of TOSOH CORP.; density: 0.925 g/cm$^3$, MI: 3; melting point: 113° C.), polypropylene ("CHISSO POLYPRO", trade name; product of Chisso Corporation; density: 0.90 g/cm$^3$; MI: 0.7; melting point: 160° C.) and a polyethylene resin having good compatibility with both polyethylene resin and polypropylene resin ("TOUGHMER", trade mark; product of MITSUI PETROCHEMICAL INDUSTRIES, LTD.; melting point: 90° C.) were kneaded at the ratio of 1:1:1 by means of a twin roll (roll temperature: 175° C.). The resultant polyblend was pressed under heat (press temperature: 185° C.), whereby sheets of about 0.2 mm thick, 200 mm long and 100 mm wide were produced.

Next, a filled container was prepared in a similar manner as in Example 1 and the performance of seals was investigated. Good hermetic sealability and easy-to-open openability were obtained.

EXAMPLE 3

By a multi-layer blown film extruder, was formed a multi-layer inflation sheet having as an inner layer a 30 μm thick layer formed of a resin mixture of linear low-density polyethylene ("NIPOLON-L", trade name; product of TOSOH CORP.; density: 0.925 g/cm$^3$; MI: 0.8; melting point: 124° C.) and polypropylene ("CHISSO POLYPRO", trade name; product of Chisso Corporation; density: 0.90 g/cm$^3$; MI: 0.7; melting point: 160° C.) and as an outer layer a 220 μm thick layer formed of linear low-density polyethylene ("NIPOLON-L", trade name; product of TOSOH CORP.; density: 0.925 g/cm$^3$; MI: 0.8; melting point: 124° C.). The flat width of the multi-layer inflation sheet was 250 mm.

A container having a similar structure as the filled container of FIG. 1 was then fabricated in such dimensions that the main body of the container, namely, the bag-shaped portion without the discharge port and hand-up hole portion was 220 mm long and 150 mm wide. Namely, a discharge port for filling or discharging a content was bonded to the surface of the sheet at one end of the container by a heat-sealing technique. The other end portion of the container was hermetically sealed by an impulse sealer and at the same time, a hang-up hole was punched out to provide a means for hanging down the container.

In addition, both sides of the container were also sealed hermetically by the impulse sealer.

At a central portion of the container, a seal having easy-to-peel openability and dividing the container into two compartments was also formed.

In both sides of the container, openings for filling the two compartments with contents respectively were left unsealed. The two compartments were filled respectively with 250 ml drug solutions which contained components reactive to each other upon sterilization. The openings were hermetically sealed by the impulse sealer, followed by autoclave sterilization.

Incidentally, the following conditions were employed in the preparation of the filled container. The hermetic seals was formed by sealing the container by the impulse sealer, which was manufactured by Fuji Impulse Co., Ltd. under the following sealing conditions: sealing time—1.5 seconds, cooling time—5 seconds. On the other hand, the seal having easy-to-peel openability was formed by the heat sealer, which was manufactured by the assignee company, under the following sealing conditions: sealing temperature—145° C., sealing time—12 seconds. The discharge port was sealed by the heat sealer, which was manufactured by the assignee company, under the following sealing conditions: sealing temperature—155° C., sealing time —15 seconds.

After sterilization and cooling, the seal having easy-to-peel openability of the filled container was not peeled off at all. Further, the container was sandwiched between two iron plates which were arranged in parallel to the sealable surfaces. The container was then pressed until the internal pressure of the container reached 0.1 kg/cm$^2$. Breakage such as peeling-off was not observed at all on the whole sealable surfaces, including the seal having easy-to-peel openability. One of the compartments of the filled container was next twisted and squeezed down by both hands. It was found that the isolation means, i.e., the seal having easy-to-peel openability was easily peeled off, so that both compartments were communicated to each other and moreover the seal having easy-to-peel openability was completely peeled off. After the seal having easy-to-peel openability was completely peeled off, the container was sandwiched between two iron plates disposed in parallel to the sealable surfaces of the container. To investigate the peelability of the peripheral seals, the container was then pressed until its internal pressure reached 0.7 kg/cm$^2$. As a result, no seal breakage was observed at the peripheral seals of each sample container. No substantial peeling was observed. It was hence found that good hermetic seals were obtained.

In addition, the degree of contamination of the final liquid content of the container by foreign materials after the complete removal of the seal having easy-to-peel openability was investigated by the filter method In spite of the preparation of the filled container through the various steps, no significant difference was found compared to the degree of contamination of a container investigated as a control, which was obtained by sealing a sheet immediately after its multi-layer blown film extrusion without opening same, namely, a container as a blank.

EXAMPLE 4

A filled container similar to that shown in FIG. 1, namely, a filled container—which had a seal formed at a central portion of the container, having easy-to-peel openability and dividing the container into two compartments, was filled with drug solutions containing components reactive to each other upon sterilization and was sterilized—was prepared in exactly the same manner as in Example 3 except that the peripheral seals, namely, the side seals and bottom seal were formed by heat sealing instead of impulse sealing.

The side and bottom seals were formed under the following conditions: sealing temperature—160° C., sealing time—5 seconds. As a heat sealer, a seal testing machine manufactured by the assignee company was used.

The performance of the container was then tested in exactly the same manner as in Example 3. Namely, the possibility of peeling or breakage of the seal having easy-to-peel openability, the opening readiness of the seal, the sealing performance of the peripheral seals and the degree of contamination of the liquid contents were investigated. The results were the same as those obtained from the container prepared in Example 3.

We claim:

1. In a filled container including a container made of a polyolefin resin and defining a plurality of compartments isolated from one another by at least one seal as a means of isolation, said seal having easy-to-peel openability, and contents filled separately in the respective compartments, whereby upon use of the filled container the contents can be mixed together without exposure to the surrounding atmosphere by breaking the isolation means from the outside and communicating the compartments to one another, the improvement wherein a resin taking part in direct bonding of at least one portion of a peripheral seal hermetically sealing a sheet or sheets of a main body of the container is the same as a resin taking part in direct bonding of the isolation means, and the resin taking part in the direct bondings is a resin mixture composed of at least two polyolefin resins of the resin mixture, wherein said first resin is a linear low-density polyethylene resin having a lower melting starting temperature in an amount of from 80 wt.% to 20 wt.%, and said second resin is a polypropylene resin having a melting starting temperature at least 8° C. higher in an amount of from 20 wt.% to 80 wt.%.

2. The filled container of claim 4, wherein each of the sheets of the main body of the container is a multi-layer sheet whose innermost layer is formed of the resin mixture.

3. The filled container of claim 2, wherein in the multi-layer sheet at least one of said at least two polyolefin resins of the resin mixture is substantially the same as at least one resin forming an adjacent layer.

4. The filled container of claim 2, wherein a thickest layer of the multi-layer sheet is formed of a linear low-density polyethylene resin.

5. The filled container of claim 2, wherein in the multi-layer sheet a layer adjacent to the innermost layer is formed of a linear low-density polyethylene resin and at least one of said at least two polyolefin resins of the resin mixture has a melting starting temperature at least 8° C. higher than the linear low-density polyethylene resin forming the layer adjacent to the innermost layer.

6. The filled container of claim 1, wherein the contents are medicinal and pharmaceutical substances, the container has at least one port for discharging the contents and a means for suspending the container, and the container and contents have been sterilized.

* * * * *